(12) United States Patent
Blatt et al.

(10) Patent No.: US 6,895,561 B2
(45) Date of Patent: May 17, 2005

(54) POWER MODELING METHODOLOGY FOR A PIPELINED PROCESSOR

(75) Inventors: Miriam G. Blatt, Menlo Park, CA (US); Poonacha Kongetira, Menlo Park, CA (US); David J. Greenhill, Portola Valley, CA (US); Vidyasagar Ganesan, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 620 days.

(21) Appl. No.: 10/010,239

(22) Filed: Dec. 7, 2001

(65) Prior Publication Data

US 2003/0110020 A1 Jun. 12, 2003

(51) Int. Cl.[7] .......................... G06F 17/50; G06F 9/455
(52) U.S. Cl. ............................... 716/1; 716/4; 703/14; 703/23
(58) Field of Search .......................... 716/1, 4; 703/14, 703/23

(56) References Cited

U.S. PATENT DOCUMENTS 5,625,803 A * 4/1997 McNelly et al. .............. 703/14
5,692,160 A * 11/1997 Sarin ........................... 703/23
5,838,947 A * 11/1998 Sarin ........................... 703/14

OTHER PUBLICATIONS

Katkoori et al., Simulation based Architectural Power Estimation for PLA-based Controllers, Internation Symposium on Low Power Electronics and Design, pp. 121–124, Aug. 1996.*

* cited by examiner

Primary Examiner—A. M. Thompson
(74) Attorney, Agent, or Firm—Osha & May L.L.P.

(57) ABSTRACT

A method for modeling the power behavior of a pipelined processor has been developed. The method uses a power model integrated into a cycle accurate simulator. To create the power model, design blocks of the processor are divided into sub-blocks. Power modeling equations for each sub-block are developed by collaboration between the sub-block circuit designer and the simulator developer, using activity information relevant to the sub-block that is available in the simulator model. Each equation is calculated multiple times with different sets of power parameters to represent varying power conditions. Every simulation cycle, sub-block power is summed to generate full-chip power for multiple power conditions.

8 Claims, 3 Drawing Sheets

POWER MODELING METHODOLOGY FOR A PIPELINED PROCESSOR

BACKGROUND OF INVENTION

In general, to achieve faster operation in a microprocessor, the instructions are broken in tasks. Then, the tasks are processed in parallel. This implementation technique is known as "pipelining". This technique is widely used for fast processing in modem microprocessors. Typically, an instruction may be divided into 5 stages: 1) fetch the instruction; 2) decode the instruction; 3) fetch the operands if necessary; 4) execute the instruction; and 5) store the results if necessary. A stage may be separated into parts depending on the application. FIG. 1 shows an example of instruction execution with/without pipelining. The top part in the FIG. 1 shows processes without the pipelining. In this case, instructions are executed sequentially. Thus, instruction 1 (2) is followed by the instruction 2 (4) after the instruction 1 (2) is complete. After the instruction 2 (4) is complete, the instruction 3 (6) starts. However, in processes with the pipelining as shown in the bottom part in the FIG. 1, when the instruction passes to the next step in the stage, a new instruction starts. Thus, instruction 1, (8) instruction 2 (10), and instruction 3 (12) are executed in parallel. The execution time is shorter than in the execution without the pipelining. As a result, this parallel execution achieves faster data processing.

In design of a microprocessor, a major concern is not only the faster operations but also power requirements. The power distribution network of a microprocessor includes some type of power source that supplies power to a distribution system. The distribution system includes resistive, capacitive and inductive elements that are connected together in a complex electrical network. With the increased clock frequency of modem and high-performance microprocessors, limiting power dissipation has become a most stringent design target. Thus, it is mandatory for processor engineers to optimize a model depending on the power requirements in processor design.

FIG. 2 shows a prior art full-chip power modeling simulation in a microprocessor. CPU activity data is generated each cycle (20) and combined with power values per unit of the activity (22) using power model equations (24). Three values are provided for each type of activity data, corresponding to minimum (MIN), typical (TYP), and maximum (MAX) circuit power conditions. The CPU activity data changes every cycle. CPU activity data can include things such as (1) the number of instructions retired in the current cycle, (2) the number of 1's in a cache line being filled from memory, and/or (3) the number of instructions in stage 3 of the floating point multiplier.

The simulator calculates the power model equation results every cycle and sums them up for all equations/sub-blocks to generate full-chip MIN, TYP, and MAX (26). After the run, power data is analyzed/summarized by various methods including taking the average over all cycles and the peak variation in power from one cycle to the next. Average power can be used to estimate the sustained temperature that the cooling system must be designed to tolerate. Peak power variation can be used to design decoupling capacitors and other circuitry to tolerate changes in inductance.

FIG. 3 shows an example of simulation results generated from a prior art full-chip power modeling simulation. In this example, the simulation results include three types of power dissipation value, maximum (Max) (30), typical (Typ) (32), and minimum (Min) (34). These values are recorded and may change over time. The power behavior may be categorized in terms of characteristic factors. A "Peak" factor is defined as the highest power point reached in a run. A "Low" factor is defined as the lowest power point reached in a run. An "average" (Avg) factor is defined as an average over a run. Simulation results may be analyzed in terms of various methods. For example, they may be analyzed in terms of Peak, Avg, Low power values, or any other user-defined characteristic factors.

Power modeling in a cycle accurate simulator provides benefits including: the ability to run orders of magnitude in more cycles than is possible in RTL or circuit level simulators; the ability to generate meaningful results early enough in the design process to modify the design, e.g., targeting particular sub-blocks for power reduction and then managing inductance changes; understanding how power behavior correlates with performance factors such as instructions executed, cache miss rates, and other CPU activity information; providing another method of generating power data to confirm estimates by other means including trend projection and static summation of MIN, TYP, and MAX sub-block power; and the ability to develop and test power diagnostic programs to test corner cases such as sustaining high or low power before silicon is available.

Power simulation using MIN and MAX conditions provides bounds on the amount of variation that could exist that may not be apparent when simulating using only the TYP conditions. Optimizing the power modeling methodology for specific requirements such as described is needed due to the continuing increase in complexity of microprocessor design.

SUMMARY OF INVENTION

In one aspect, a method for modeling power of a pipelined processor comprises breaking at least one design block of the processor into a plurality of sub-blocks, determining a plurality of categories of power dissipation of each sub-block, constructing a power simulation equation for each category of power dissipation of each sub-block, determining coefficients of each power simulation equation, applying a power simulation program to each power simulation equation to calculate the power of each sub-block, and summing the power of each sub-block to calculate the power of the processor.

In other aspects, a method for modeling the power of a pipelined processor comprises a step of breaking the processor down into design sub-blocks, a step of determining power simulation equations for each sub-block, a step of running circuit simulations to generate coefficient values to be used in power equations, a step of adding instructions to a cycle accurate simulator to extract activity data needed for equations, a step of calculating results of the equations, a step of running a benchmark program on the cycle accurate simulator, a step of, during each cycle of a simulation run, calculating power for the sub-blocks, and a step of developing metrics to summarize power over the run of the benchmark program.

Other aspects and advantages of the invention will be apparent from the following description and the appended claims.

DETAILED DESCRIPTION

Figure 1:
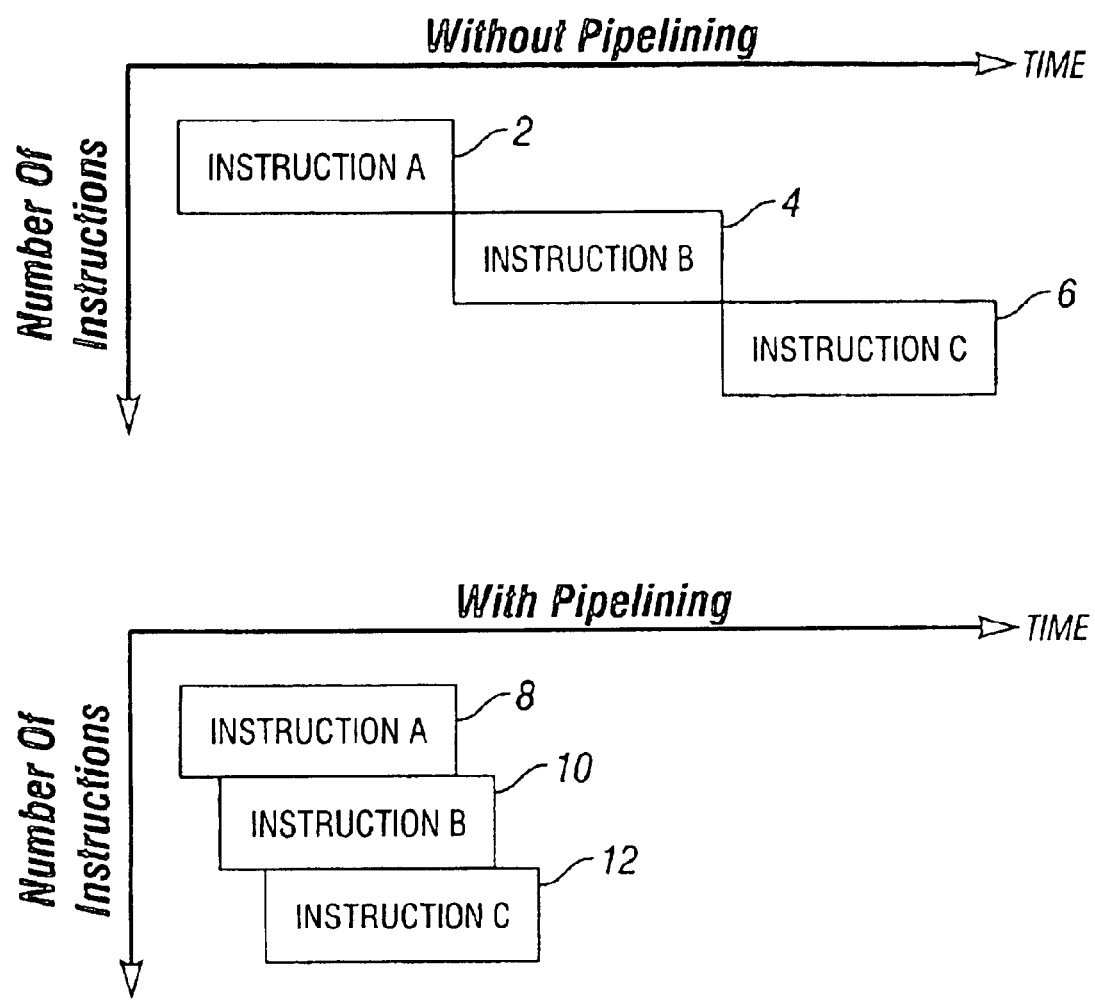
FIG. 1 shows an example of instruction execution with/without pipelining. The top part of the diagram shows instruction execution without pipelining. The bottom part of the diagram shows instruction execution with pipelining.
Figure 2:
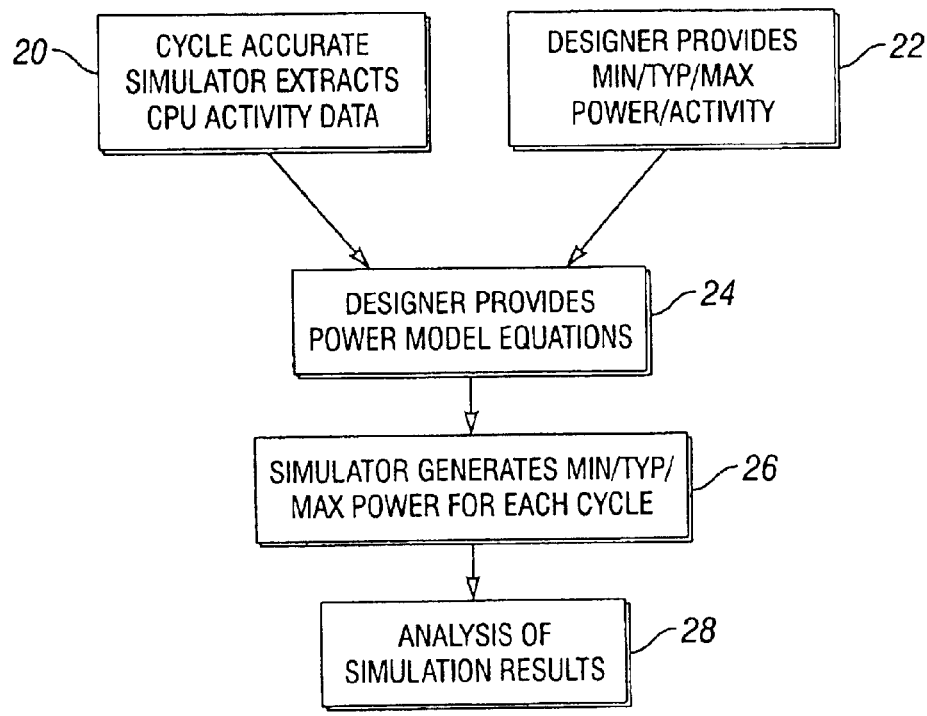
FIG. 2 shows a prior art full-chip power modeling simulation in a microprocessor.
Figure 3:
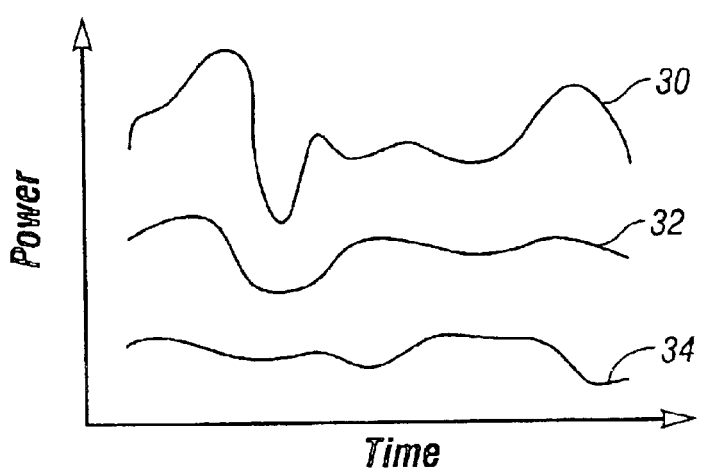
FIG. 3 shows an example of simulation results generated from a prior art full-chip power modeling simulation. The upper curve (30) shows a worst case maximum power (MAX) during a run. The middle curve shows a typical power (TYP) for each cycle of the run. The lower curve shows a minimum value (MIN) at each cycle in the run.
Figure 4:
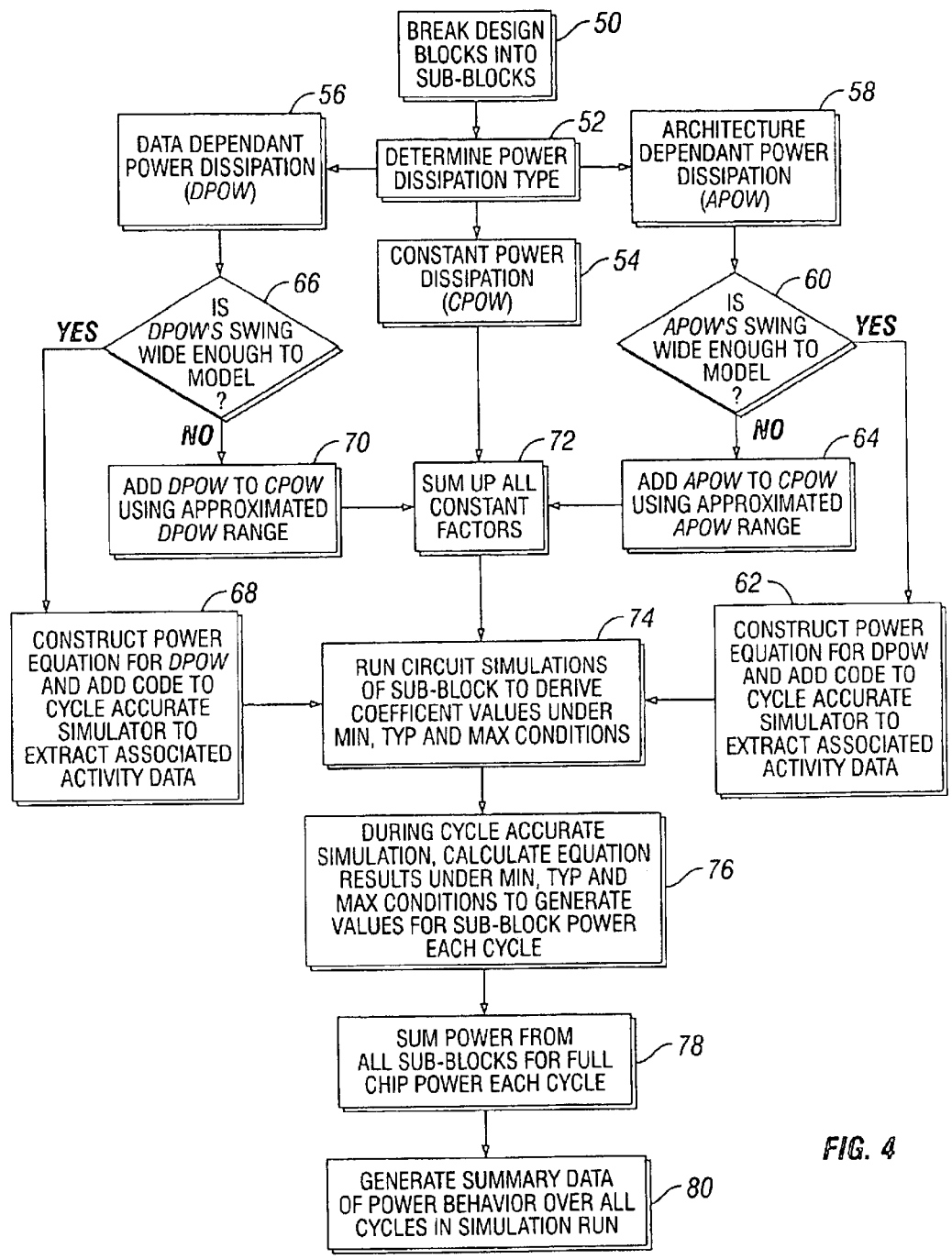
FIG. 4 shows a flow chart of the power modeling methodology in accordance with an embodiment of the present invention.

The present invention provides a method of selectively introducing power information for each design block including a number of sub-blocks and then modeling power dissipation for design blocks. FIG. 4 shows a flow chart of the power modeling methodology in accordance with an embodiment of the present invention. In the first stage (50), a design block is broken into a number of sub-blocks. For example, a CPU may be broken into a number of functional sub-blocks, such as register file blocks, integer multiplier blocks, cache tag blocks, etc.

In the second stage (52), power dissipation of the sub-blocks is categorized in terms of power dissipation factors: constant power dissipation (CPOW) (54); data dependent power dissipation (DPOW) (56); and architecturally dependent power dissipation (APOW) (58). The CPOW is a factor for constant power dissipation, which may originate from clocks, leakage, and enabled circuitry. The DPOW factor models data dependent power dissipation, which may originate from the number of 1 bits or bit flips in a piece of processor data. The APOW factor models architectural power dissipation, which may originate from architectural activity within the processor such as the number of instructions retiring, or the number of divide instructions in stage N of the divide pipe. If the APOW can generate a power swing wide enough to justify modeling (60), an equation for the sub-block is constructed (62). However, if the APOW swing is too small to model, the APOW contribution is added to the CPOW using the power coefficients of Max, Typ, and Min levels to approximate the APOW range (64).

DPOW modeling proceeds in a similar fashion to the APOW process. If the DPOW can generate a power swing wide enough to justify modeling (66), an equation for the sub-block is constructed (68). However, if the DPOW swing is too small to model, the DPOW contribution is added to the CPOW using the power coefficients of Max, Typ, and Min levels to approximate the DPOW range (70). Consequently, if both APOW and CPOW variations are too small to model with equations, the entire sub-block power is modeled as a sum of constants representing APOW, DPOW, and CPOW (72).

In the next stage, constant power factors are summed for CPOW (72), and if necessary, equations are constructed for APOW (62) and/or DPOW (68). For DPOW, the sum for each sub-block component may be expressed as follows: (number of 1 bits or bit flips in data)×(MIN/TYP/MAX power coefficient). For APOW, the sum for each sub-block component may be expressed as follows: (number of architectural operations)×(MIN/TYP/MAX power coefficient). For CPOW, the sum for each sub-block component may be expressed as follows: clock power+leakage power+(MIN/TYP/MAX of circuits modeled as constant).

Power coefficients are generated for each sub-block by running circuit simulations in minimum, typical, and maximum power conditions (74). While running the cycle accurate simulator, these coefficients are combined with the number of architectural operations and 1 bits or bit flips to calculate the power for all sub-blocks each cycle (76) under MIN, TYP, and MAX conditions. The power for the sub-blocks is summed to generate full-chip power each cycle (78). Summary data including average power and peak change from one cycle to the next is generated to characterize the behavior over all cycles of a particular benchmark program that was run on the cycle accurate simulator (80). Summary data is generated for all power levels MIN, TYP, and MAX.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for modeling power of a pipelined processor, comprising:

breaking at least one design block of the processor into a plurality of sub-blocks;

determining a plurality of categories of power dissipation of each sub-block;

constructing a power simulation equation for each category of power dissipation of each sub-block;

determining coefficients of each power simulation equation;

applying a power simulation program to each power simulation equation to calculate the power of each sub-block; and summing the power of each sub-block to calculate the power of the processor.

2. The method of claim 1, wherein the categories of power dissipation comprise:

a data dependent power category;

an architecture dependent power category; and a constant power category.

3. The method of claim 2, wherein the data dependent power is dependent upon data values used and generated by a sub-block.

4. The method of claim 2, wherein the architecture dependent power is dependent on architectural activity within a sub-block.

5. The method of claim 2, further comprising:

approximating a performance range for the data dependent power category;

adding the approximated performance range for the data dependent power category to the constant power category.

6. The method of claim 2, further comprising:

approximating a performance range for the architecture dependent power category;

adding the approximated performance range for the architecture dependent power category to the constant power category.

7. The method of claim 1, wherein the coefficients of each power simulation equation comprise:

a minimum value;

a typical value; and a maximum value.

8. A method for modeling the power of a pipelined processor, comprising:
- a step of breaking the processor down into design sub-blocks;
- a step of determining power simulation equations for each sub-block;
- a step of running circuit simulations to generate coefficient values to be used in power equations;
- a step of adding instructions to a cycle accurate simulator to extract activity data needed for equations;
- a step of calculating results of the equations;
- a step of running a benchmark program on the cycle accurate simulator;
- a step of, during each cycle of a simulation run, calculating power for the sub-blocks; and
- a step of developing metrics to summarize power over the run of the benchmark program.

* * * * *